United States Patent
Stoia et al.

(10) Patent No.: US 11,629,857 B2
(45) Date of Patent: Apr. 18, 2023

(54) COMBUSTOR HAVING A WAKE ENERGIZER

(71) Applicant: General Electric Company, Schenectady, NY (US)

(72) Inventors: Lucas John Stoia, Taylors, SC (US); Homayoon Feiz, Greenville, SC (US); Shreekrishna Rao, Simpsonville, SC (US); Emily Klara Happ, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/218,393

(22) Filed: Mar. 31, 2021

(65) Prior Publication Data

US 2022/0316708 A1  Oct. 6, 2022

(51) Int. Cl.
| | | |
|---|---|---|
| *F23R 3/16* | (2006.01) | |
| *F02C 7/232* | (2006.01) | |
| *F23R 3/00* | (2006.01) | |
| *F23R 3/26* | (2006.01) | |

(52) U.S. Cl.
CPC ............... *F23R 3/16* (2013.01); *F02C 7/232* (2013.01); *F23R 3/002* (2013.01); *F23R 3/26* (2013.01); *F05D 2220/32* (2013.01); *F05D 2240/35* (2013.01)

(58) Field of Classification Search
CPC .... F23R 3/002; F23R 3/16; F23R 3/04; F23R 3/26; F23R 2900/03045
See application file for complete search history.

(56) References Cited

U.S. PATENT DOCUMENTS

| | | |
|---|---|---|
| 6,435,816 B1 | 8/2002 | Czachor |
| 8,397,514 B2 | 3/2013 | Crawley et al. |
| 8,899,975 B2 | 12/2014 | Khan et al. |
| 8,919,127 B2 | 12/2014 | Melton et al. |
| 9,267,687 B2 | 2/2016 | Khan et al. |
| 9,416,974 B2 | 8/2016 | Toronto et al. |
| 9,494,321 B2 | 11/2016 | Melton et al. |

(Continued)

FOREIGN PATENT DOCUMENTS

JP  2013224659 A  10/2013

OTHER PUBLICATIONS

European Search Report Corresponding to Application No. 22163898 dated Aug. 16, 2022.

*Primary Examiner* — Arun Goyal
*Assistant Examiner* — Henry Ng
(74) *Attorney, Agent, or Firm* — Dority & Manning, P.A.

(57) ABSTRACT

Combustors and gas turbines are provided. A combustor includes an axial centerline and an end cover. The combustor further includes at least one fuel nozzle that extends from the end cover and at is least partially surrounded by a combustion liner. The combustion liner extends between the at least one fuel nozzle and an aft frame and that defines a combustion chamber. An outer sleeve is spaced apart from and surrounds the combustion liner such that an annulus is defined therebetween. The outer sleeve defines at least one aperture. A wake energizer is mounted on the outer sleeve. The wake energizer defines at least one passage that is angled with respect to the axial centerline of the combustor. The at least one passage aligns and is in fluid communication with the at least one aperture of the outer sleeve.

17 Claims, 4 Drawing Sheets

(56) References Cited

U.S. PATENT DOCUMENTS

| | | | |
|---|---|---|---|
| 9,739,201 B2 | 8/2017 | Pushkaran et al. | |
| 10,344,978 B2 | 7/2019 | Godfrey et al. | |
| 2012/0159954 A1 | 6/2012 | Ito et al. | |
| 2012/0297786 A1* | 11/2012 | Crawley | F23R 3/286 60/740 |
| 2013/0086921 A1* | 4/2013 | Matthews | F23R 3/04 60/785 |
| 2013/0111909 A1* | 5/2013 | Khan | F23R 3/002 60/752 |
| 2014/0116058 A1* | 5/2014 | Chen | F23R 3/002 60/754 |
| 2014/0260264 A1* | 9/2014 | Stoia | F02C 9/52 60/734 |
| 2014/0331674 A1* | 11/2014 | Pushkaran | F23R 3/005 60/734 |
| 2014/0331681 A1* | 11/2014 | Parsania | F23R 3/002 60/755 |
| 2015/0159872 A1* | 6/2015 | Melton | F23R 3/08 60/740 |
| 2016/0047317 A1* | 2/2016 | Willis | F02C 7/22 60/740 |
| 2019/0195496 A1* | 6/2019 | Moura | F23R 3/002 |
| 2019/0219267 A1* | 7/2019 | Moura | F23R 3/045 |
| 2019/0219268 A1* | 7/2019 | Moura | F01D 5/189 |

\* cited by examiner

COMBUSTOR HAVING A WAKE ENERGIZER

FIELD

The present disclosure relates generally to a turbomachine combustor. In particular, the present disclosure relates to a combustor having structure that reduces flow wakes within an annulus.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Typically, the combustion section includes a plurality of circumferentially spaced combustors, which separately convey combustion gases to the turbine section. Each combustor generally includes a combustion liner defining one or more combustion zones and an outer sleeve spaced apart from the combustion liner. An annulus can be defined between the combustion liner and the outer sleeve for collecting and conveying pressurized air from the compression section to one or more fuel nozzles within the combustor.

It is desirable for the air within the annulus to be as uniformly distributed as possible, such that it may be equally distributed within the one or more fuel nozzles for a homogenous mixture of fuel and air prior to combustion. However, many combustors include flow blockages, such as flame detection sensors, cross-fire tubes, and/or axial fuel staging fuel injectors, which each extend through the annulus and can create flow wakes.

Accordingly, an improved combustor, that includes one or more flow blockages without creating an undesired flow wake within the annulus, is desired in the art.

BRIEF DESCRIPTION

Aspects and advantages of the combustors and turbomachines in accordance with the present disclosure will be set forth in part in the following description, or may be obvious from the description, or may be learned through practice of the technology.

In accordance with one embodiment, a combustor is provided. The combustor includes an axial centerline and an end cover. The combustor further includes at least one fuel nozzle that extends from the end cover and at is least partially surrounded by a combustion liner. The combustion liner extends between the at least one fuel nozzle and an aft frame and that defines a combustion chamber. An outer sleeve is spaced apart from and surrounds the combustion liner such that an annulus is defined therebetween. The outer sleeve defines at least one aperture. A wake energizer is mounted on the outer sleeve. The wake energizer defines at least one passage that is angled with respect to the axial centerline of the combustor. The at least one passage aligns and is in fluid communication with the at least one aperture of the outer sleeve.

In accordance with another embodiment, a turbomachine is provided. The turbomachine includes a compressor section, a turbine section, and a combustor disposed downstream from the compressor section and upstream from the turbine section. The combustor includes an axial centerline and an end cover. The combustor further includes at least one fuel nozzle that extends from the end cover and at is least partially surrounded by a combustion liner. The combustion liner extends between the at least one fuel nozzle and an aft frame and that defines a combustion chamber. An outer sleeve is spaced apart from and surrounds the combustion liner such that an annulus is defined therebetween. The outer sleeve defines at least one aperture. A wake energizer is mounted on the outer sleeve. The wake energizer defines at least one passage that is angled with respect to the axial centerline of the combustor. The at least one passage aligns and is in fluid communication with the at least one aperture of the outer sleeve.

These and other features, aspects and advantages of the present combustors and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustors and turbomachines, including the best mode of making and using the present systems and methods, directed to one of ordinary skill in the art, is set forth in the specification, which makes reference to the appended figures, in which.

DETAILED DESCRIPTION

Figure 1:
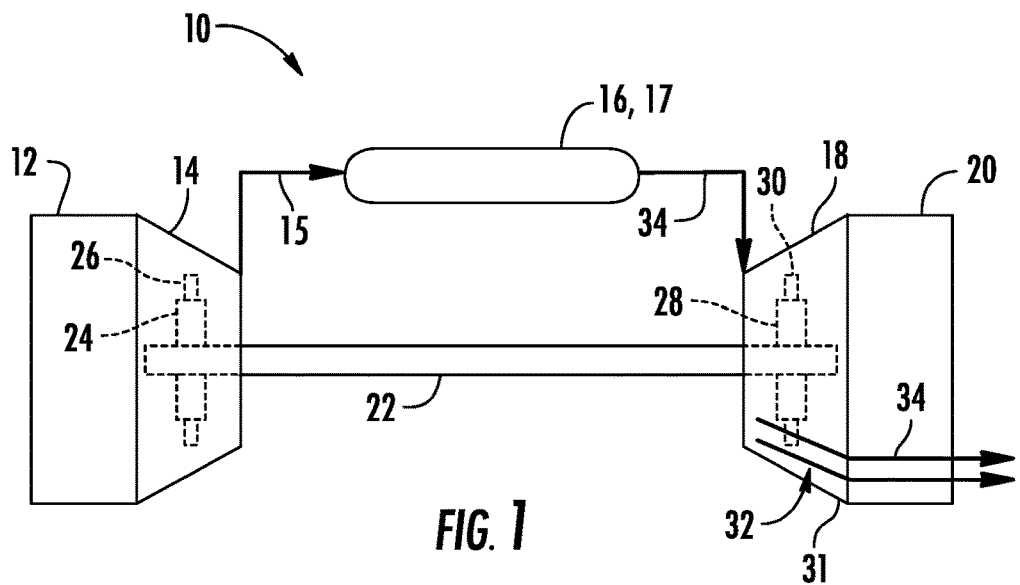
FIG. 1 is a schematic illustration of a turbomachine in accordance with embodiments of the present disclosure.

Reference now will be made in detail to embodiments of the present combustors and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors 17 within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air or compressed air 15 to the combustors of the combustor section 16. The compressed air 15 is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
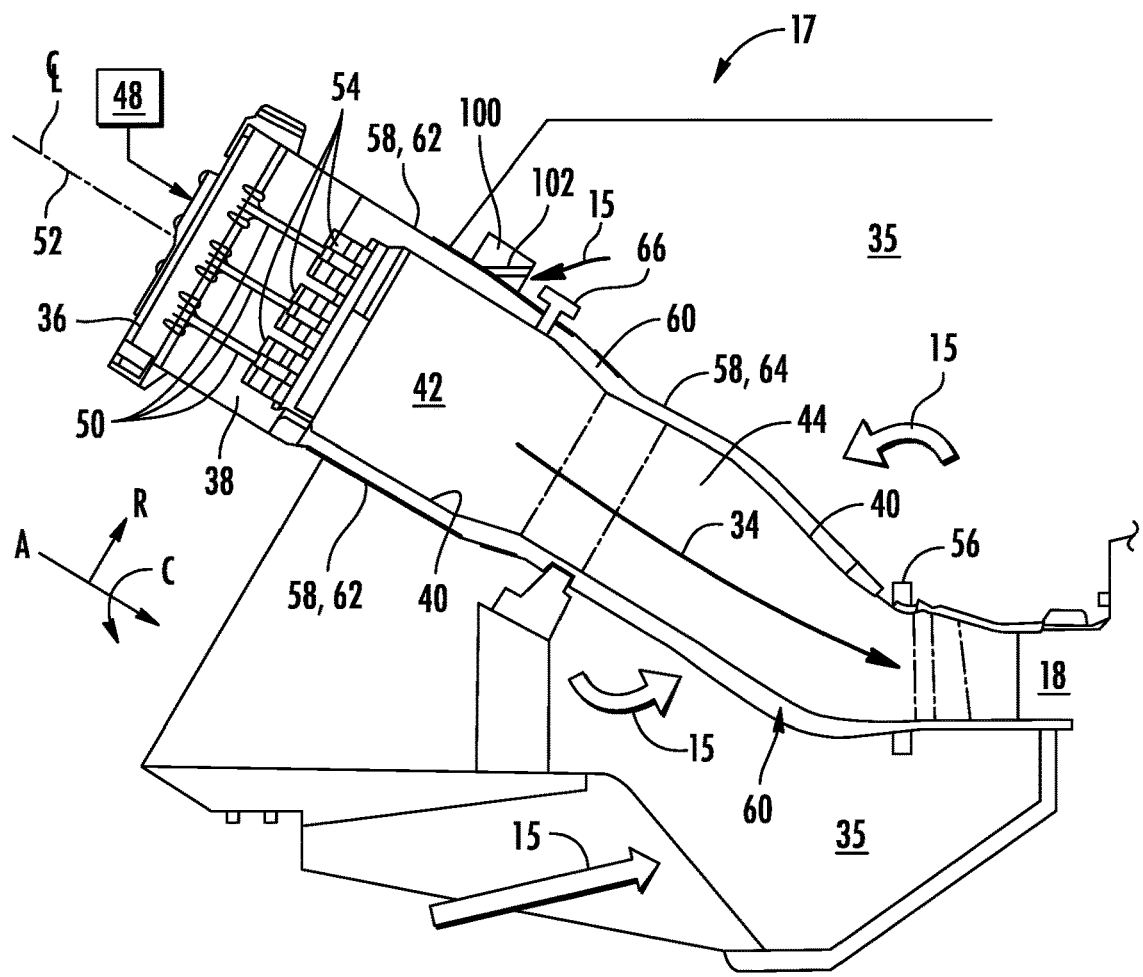
FIG. 2 illustrates a schematic cross sectional view of a combustor, in accordance with embodiments of the present disclosure.

FIG. 2 is a schematic representation of a combustor 17, as may be included in a can annular combustion system for the gas turbine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 52. The combustor may also define a circumferential direction C which extends around the axial direction A and the axial centerline 52. The combustor 17 may further define a radial direction R perpendicular to the axial direction A and the axial centerline 52.

The combustor 17 may be at least partially surrounded by an outer casing 33 such as a compressor discharge casing. The outer casing 33 may at least partially define a high-pressure plenum 35 that at least partially surrounds various components of the combustor 17. The high-pressure plenum 35 may be in fluid communication with the compressor section 14 (FIG. 1) so as to receive compressed air 15 therefrom. An end cover 36 may be coupled to the outer casing 33. In particular embodiments, the outer casing 33 and the end cover 36 may at least partially define a head end volume or portion 38 of the combustor 17.

In particular embodiments, the head end portion 38 is in fluid communication with the high-pressure plenum 35 and/or the compressor section 14 via an annulus 60. A combustion liner 40 may at least partially define a combustion chamber or zone 42 for combusting the fuel-air mixture and/or may at least partially define a hot gas path through the combustor 17 for directing the combustion gases 34 towards an inlet to the turbine section 18.

In various embodiments, the combustor 17 includes at least one fuel nozzle assembly 54. As shown in FIG. 2, the fuel nozzle assembly 54 is disposed within the head end portion 38 downstream from and/or axially spaced from the end cover 36 with respect to axial centerline 52 of the combustor 17 and upstream from the combustion chamber 42. In particular embodiments, the fuel nozzle assembly 54 is in fluid communication with a fuel supply 48 via one or more fluid conduits 50. In particular embodiments, the fluid conduit(s) 50 may be fluidly coupled and/or connected at one end to the end cover 36. It should be understood that the fuel nozzle assemblies 54 and/or the fluid conduit(s) may be mounted to structures other than the end cover 36 (e.g., the outer casing 33).

The combustor 17 may include a combustion liner 40 that contains and conveys combustion gases 34 to the turbine. The combustion liner 40 defines a combustion chamber 42 within which combustion occurs. As shown in FIG. 2, the combustion liner may extend between a fuel nozzle assembly 54 and an aft frame 56. The combustion liner 40 may have a cylindrical liner portion and a tapered transition portion that is separate from the cylindrical liner portion, as in many conventional combustion systems. Alternately, the combustion liner 40 may have a unified body (or "unibody") construction, in which the cylindrical portion and the tapered portion are integrated with one another. Thus, any discussion of the combustion liner 40 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The combustion liner 40 may be surrounded by an outer sleeve 58, which is spaced radially outward of the combustion liner 40 to define an annulus 60 between the combustion liner 40 and the outer sleeve 58. The annulus 60 may provide for fluid communication between the high-pressure plenum 35 and the head end portion 38. For example, compressed air 15 flows from high-pressure plenum 35 into the annulus 60, via openings defined in the outer sleeve 58. Specifically, the compressed air 15 travels upstream from aft frame 56 of the combustor 17 to the head end portion 38, where the compressed air 15 reverses direction and enters the fuel nozzle assembly 54.

In exemplary embodiments, the outer sleeve 58 may include a flow sleeve 62 at the forward end and an impingement sleeve 64 at the aft end. The flow sleeve 62 and the impingement sleeve 64 may be coupled to one another. For example, the flow sleeve 62 may include a first end or forward end that is coupled to the end cover 36 and a second end or aft end that extends into and axially overlaps with a forward end of the impingement sleeve 64, such that an interference fit is formed between the impingement sleeve 64 and the flow sleeve 62. In many embodiments, the flow sleeve 62 extends between the end cover 36 and the impingement sleeve 64. As shown, the impingement sleeve may extend between the flow sleeve 62 and an aft frame 56 of the combustor 17. Alternately, the outer sleeve 58 may have a unified body (or "unisleeve") construction, in which the flow sleeve 62 and the impingement sleeve 64 are integrated with one another in the axial direction. As before, any discussion of the outer sleeve 58 herein is intended to encompass both convention combustion systems having a separate flow sleeve 62 and impingement sleeve 64 and combustion systems having a unisleeve outer sleeve. However, in exemplary embodiments of the present disclosure, the combustor 17 includes a flow sleeve 62 and an impingement sleeve 64 as separate components coupled to one another.

As shown in FIG. 2, one or more airflow blockages 66 may extend at least partially through the annulus 60. The airflow blockage 66 may be any one of a crossfire tube, a flame detector, an axial fuel staging injector, an igniter, a pressure sensor, a temperature sensor (such as a thermocouple), or other structure that extends at least partially into the annulus 60. In operation, the airflow blockage 66 may create a flow wake within the annulus 60. For example, compressed air 15 may enter the annulus 60 and flow past the airflow blockage 66, during which the compressed air 15 may from a boundary layer with the airflow blockage 66 that can result in non-uniform airflow within the annulus 60. As should be appreciated, a boundary layer is the layer of fluid in the immediate vicinity of a bounding surface where the effects of viscosity are significant.

In exemplary embodiments, the combustor 17 may further include a wake energizer 100 configured to diffuse flow wakes within the annulus 60. As shown, the wake energizer 100 may be disposed forward of the airflow blockage 66, such that the wake energizer 100 is operable to reduce or eliminate any effects to the airflow within the annulus 60 caused by the airflow blockage 66. The wake energizer 100 may be mounted to the outer sleeve 58 in a variety of different ways. For example, in some embodiments, the wake energizer 100 may be fixedly coupled to the outer sleeve 58 (e.g. via welding and/or brazing). In other embodiments, the wake energizer 100 may be removably coupled to the outer sleeve 58 (e.g. via one or more threaded bolts and fasters).

As discussed in more detail below, the wake energizer 100 may define at least one passage 102 that is angled with respect to the axial centerline 52 of the combustor 17. The at least one passage 102 may provide for fluid communication between the high-pressure plenum 35 and the annulus 60. For example, the at least one passage 102 may introduce an additional stream of compressed air 15 into the annulus at an angle that advantageously diffuses any flow wakes forward of the airflow blockage 66.

In various embodiments, the at least one passage 102 of the wake energizer may align with, and be in fluid communication with, at least one aperture 74 defined in the outer sleeve 58. In exemplary embodiments, the at least one aperture 74 may be defined in the flow sleeve 62. However, in additional or alternative embodiments, the at least one aperture 74 may be defined in the impingement sleeve 64 (e.g. depending on the mounting location of the wake energizer 100). Particularly, the outer sleeve 58 may define a corresponding number of apertures 74 as the number of passages 102 defined in the one or more wake energizers 100 mounted thereon. In many embodiments, each passage 102 may fluidly couple to a respective aperture 74 of the outer sleeve 58, such that, in embodiments where the wake energizer 100 includes multiple passages 102, a corresponding number of distinct air streams may be introduced into the annulus 60.

Figure 3:
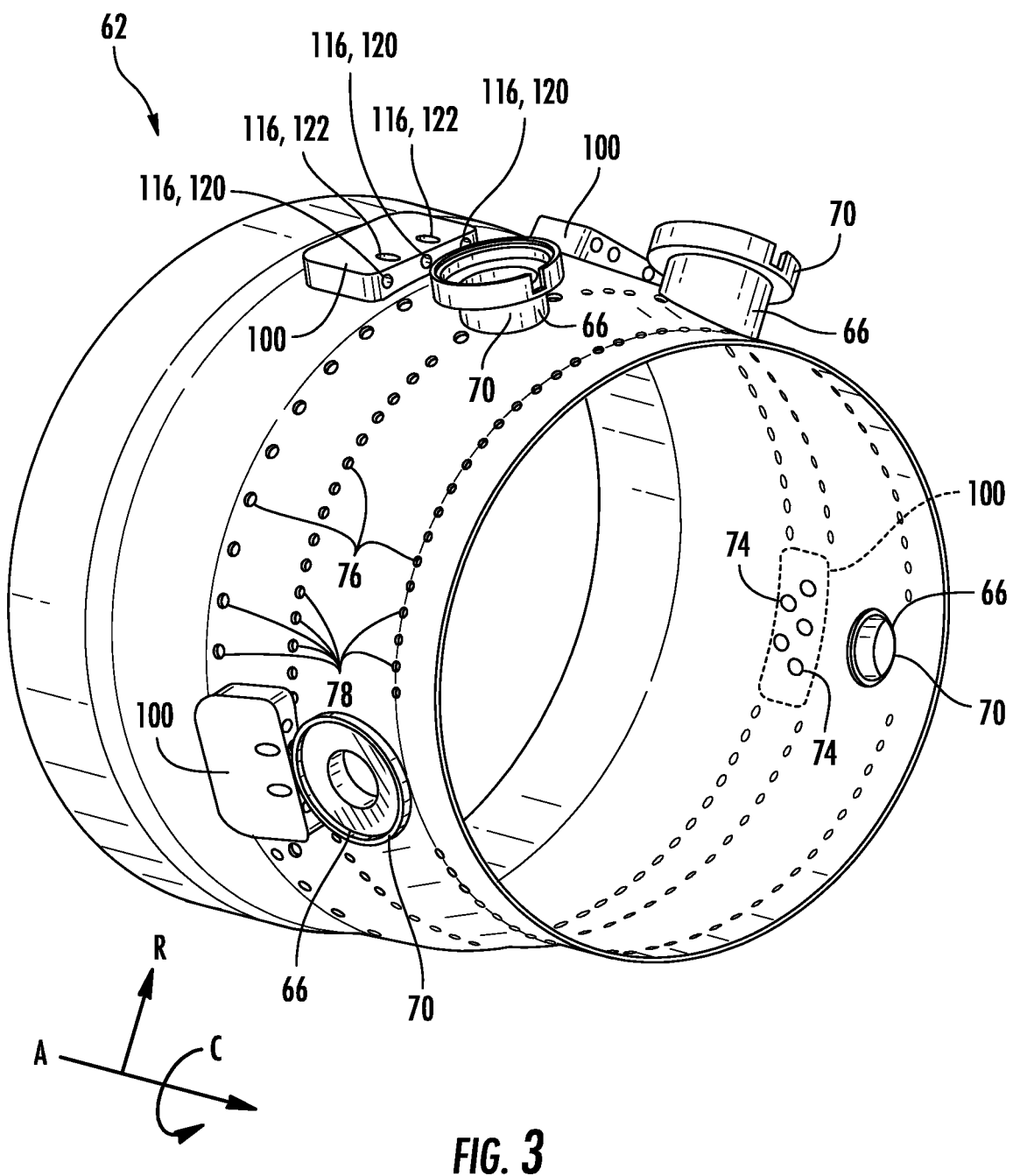
FIG. 3 illustrates a perspective view of a flow sleeve of an outer sleeve of a combustor, in accordance with embodiments of the present disclosure.

FIG. 3 illustrates a perspective view of a flow sleeve 62 of an outer sleeve 58, which is isolated from various other components of the combustor 17, in accordance with embodiments of the present disclosure. As shown, the flow sleeve 62 may include conduits 70 that extend radially outwardly therefrom. The conduits 70 may define openings 72 that allow the one or more airflow blockages 66 to be inserted into the annulus 60 during installation of the combustor 17. In some embodiments, the conduits 70 may define at least a portion of the airflow blockage 66, such that they may extend radially inward from the flow sleeve 62 and at least partially into the annulus 60.

As shown in FIG. 3, the flow sleeve 62 may have a plurality of wake energizers 100 spaced apart from one another and each mounted on the flow sleeve 62. For example, the wake energizers 100 may be circumferentially and/or axially spaced apart from one another and mounted on the flow sleeve 62. In particular, a wake energizer 100 may be positioned forward of the location of an airflow blockage 66 within the annulus 60. For example, as shown in FIG. 3, each of the wake energizers 100 may be positioned axially forward a respective airflow blockage 66 and/or conduit 70. Specifically, a wake energizer 100 may be positioned at the same circumferential location as a respective airflow blockage 66 but may be axially forward of the airflow blockage 66, such that the wake energizer 100 is operable to neutralize any wakes created by the airflow blockage 66 within the annulus 60.

Additionally, as shown in FIG. 3, the flow sleeve 62 may define apertures 74 at the mounting location of each respective wake energizer 100. Each aperture 74 may align with an outlet of a respective passage 102 defined within each of the wake energizers 100, in order to provide for fluid communication between the wake energizer 100 and the annulus 60.

In various embodiments, the flow sleeve 62 may further define multiple rows 76 of impingement apertures 78 in the circumferential direction of the combustor 17. As shown in FIG. 3, The multiple rows 76 of impingement apertures 78 may be axially spaced apart from one another. In exemplary embodiments, the multiple rows 76 of impingement apertures 78 may fluidly couple the high-pressure plenum 35 to the annulus 60. As shown in FIG. 3, each impingement aperture 78 in a row 76 may be circumferentially spaced apart and at a similar axial location, such that each impingement apertures 78 in a row 76 is positioned on a common circumferentially extending line. The rows 76 of impingement apertures 78 defined within the flow sleeve 62 may increase the flow uniformity of compressed air 15 within the annulus 60 by introducing a circumferentially uniform flow of compressed air at varying axial locations, thereby increasing the efficiency of the combustor 17.

As shown in FIG. 3, the wake energizers 100 may be mounted on the flow sleeve 62 at various locations relative to the multiple rows 76 of impingement apertures 78. For example, one or more wake energizers 100 may be disposed between two rows 76 of the multiple rows 76 of impingement apertures. Additionally or alternatively, one or more wake energizers 100 may be disposed axially forward of all the rows 76 of impingement apertures. In yet still further embodiments (not shown), one or more wake energizers 100 may be disposed axially forward of all the rows 76 of impingement apertures 78.

Figure 4:
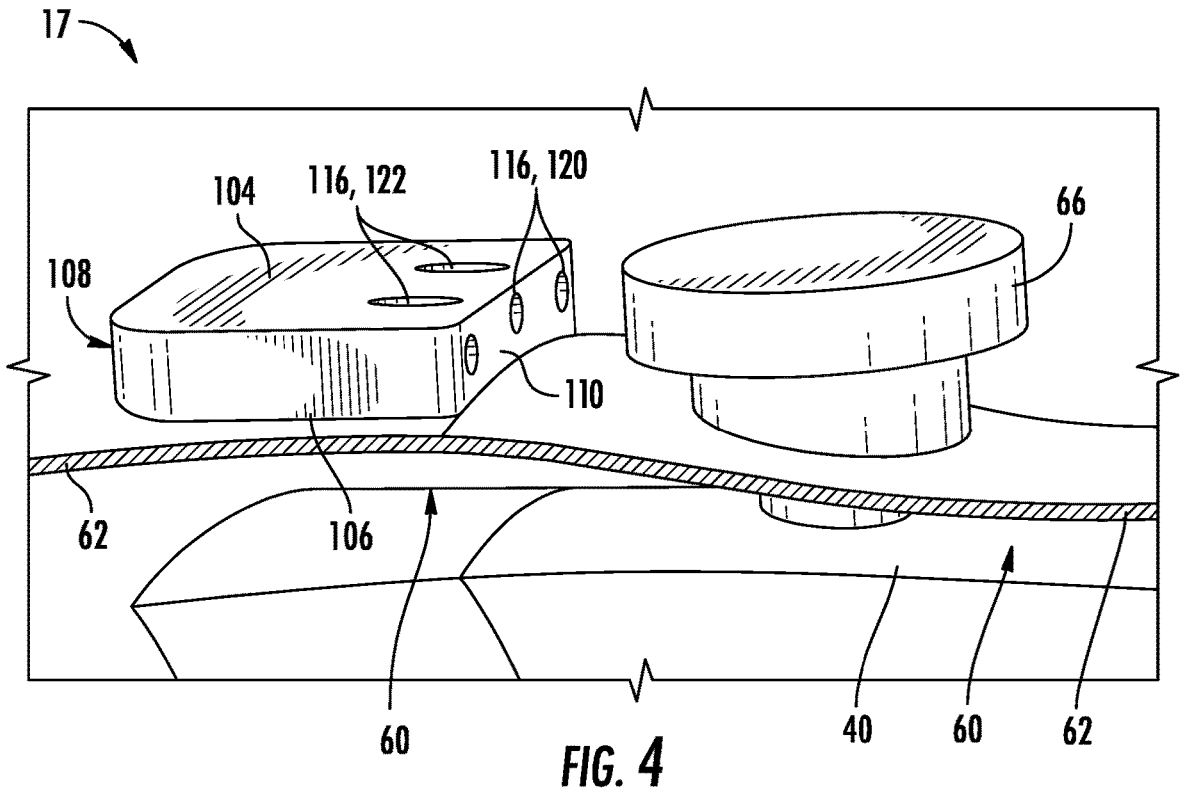
FIG. 4 illustrates an enlarged cross sectional perspective view of a combustor, in accordance with embodiments of the present disclosure.
Figure 5:
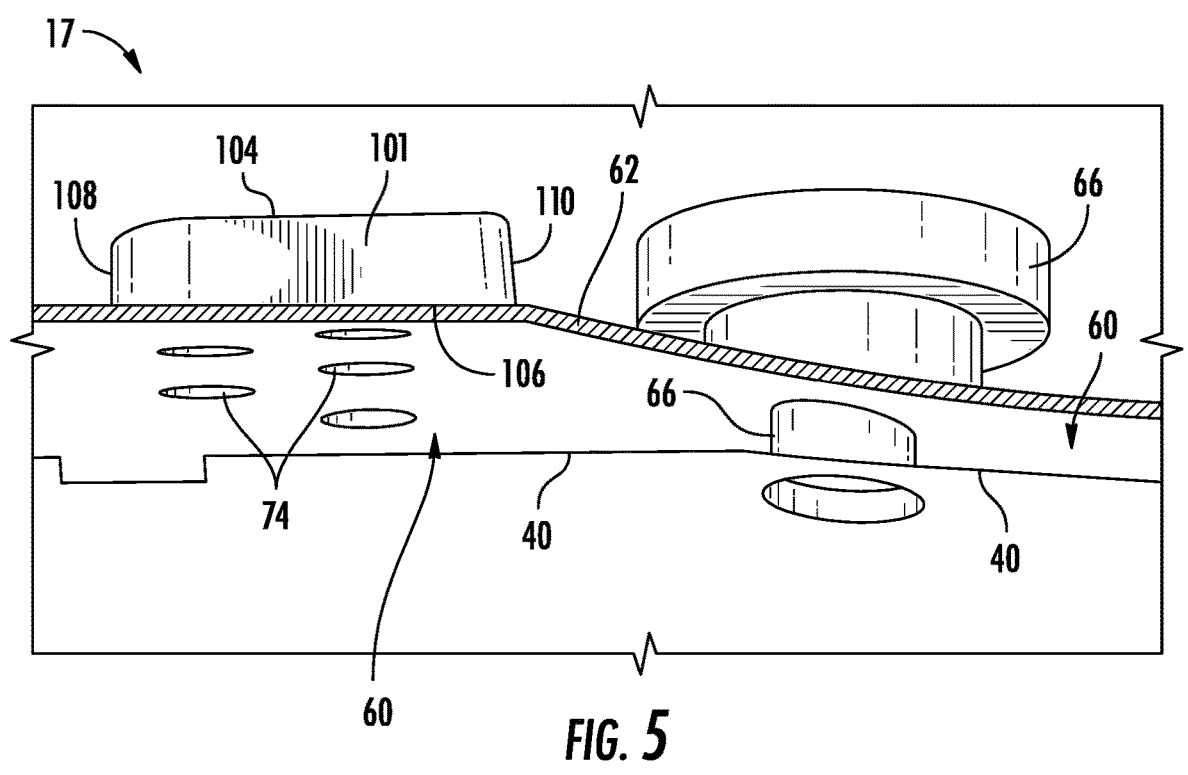
FIG. 5 illustrates an enlarged cross sectional perspective view of a combustor, in accordance with embodiments of the present disclosure.

FIGS. 4 and 5 illustrate enlarged cross-sectional perspective views of a combustor 17 having a wake energizer 100 mounted thereon, in accordance with embodiments of the present disclosure. The wake flow energizer 100 may extend radially outward from the flow sleeve 62 and may take a variety of forms. For example, as shown, the wake energizer 100 may be generally shaped as a rectangular prism. More specifically, the wake energizer 100 may be shaped as a rectangular prism having a single side that is contoured to correspond to the curve in the flow sleeve 62, in order to mount flush with the radially outer surface of the flow sleeve 62. For example, the wake energizer 100 may define six sides, of which 5 are generally flat and 1 is curved or contoured to correspond with the curvature of the flow sleeve 62. In other embodiments (not shown), the wake energizer 100 may have any suitable shape that extends radially outwardly form the outer surface of the flow sleeve 62.

In particular, the wake energizer 100 may define a radially outer surface 104, a radially inner surface 106, a forward surface 108, an aft surface 110, and side surfaces 112. The radially outer surface 104 and the radially inner surface 106 may be radially spaced apart from one another. Additionally, the radially inner surface 106 may be generally curved to correspond with the outer sleeve 58. Specifically, the radially inner surface may be contoured to correspond with the radially outer surface of the flow sleeve 62 (to which it is attached). The forward surface 108 and the aft surface 110 may each be generally flat surfaces spaced apart from one another in the axial direction A of the combustor 17. Additionally, the forward surface 108 and the aft surface 110 may extend generally along the radial direction R and may be generally parallel to one another. The side surfaces 112 may each be generally flat surfaces spaced apart from one another along the circumferential direction C. In many embodiments, the side surfaces 112 may extend between the forward surface 108, the aft surface 110, the radially inner surface 106, and the radially outer surface 104.

The radially inner surface 106 may be the only surface of the wake energizer 100 in contact with the combustor 17. For example, all the other surfaces of the wake energizer 100 may be disposed within the high-pressure plenum 35, such that they are surrounded by compressed air 15 during operation of the gas turbine 10.

In many embodiments, the wake energizer 100 described herein may be integrally formed as a single component. That is, each of the subcomponents may be manufactured together as a single body. In exemplary embodiments, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In this regard, by utilizing additive manufacturing methods, the wake energizer 100 may be integrally formed as a single piece of continuous metal and may thus include fewer sub-components and/or joints compared to prior designs. The integral formation of the wake energizer 100 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. Further, the integral formation of the wake energizer 100 may favorably reduce the overall weight of the wake energizer 100 as compared to other manufacturing methods.

Figure 6:
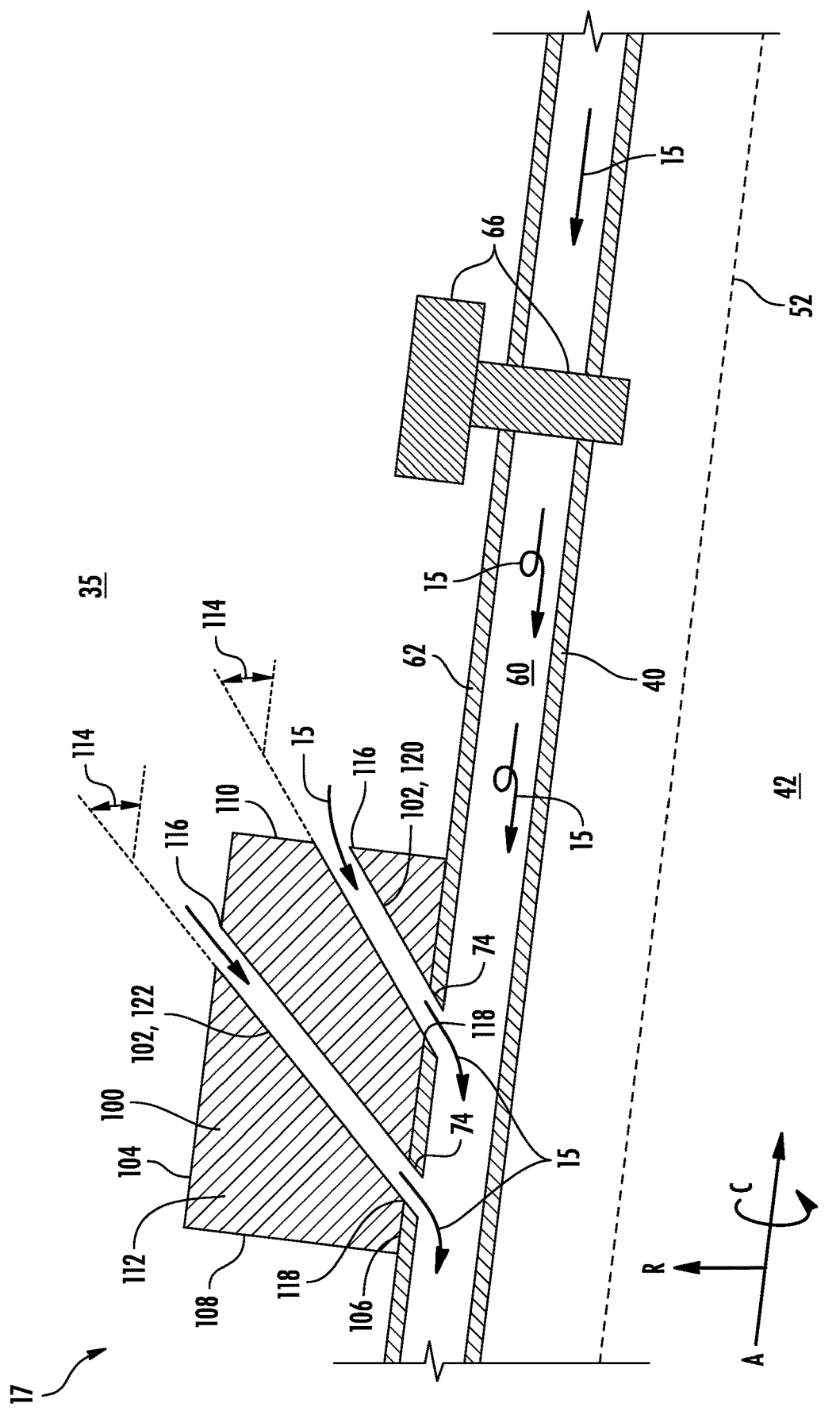
FIG. 6 illustrates an enlarged cross sectional view of a combustor, in accordance with embodiments of the present disclosure.

FIG. 6 illustrates an enlarged cross-sectional view of a combustor 17 having a wake energizer 100 mounted thereon, in accordance with embodiments of the present disclosure. As shown, the wake energizer 100 may define at least one passage 102 in fluid communication with both the high-pressure plenum 35 and the annulus 60. For example, in the embodiment shown in FIG. 6, the wake energizer 100 may define two passages 102. However, in other embodiments, the wake energizer 100 may define up to five or more passages 102 (e.g. the wake energizer 100 shown in FIG. 3 includes five passages 102).

In some embodiments, such as the one illustrated in FIG. 6, the passages 102 of the wake energizer 100 may each have a uniform (i.e., constant or unchanging) diameter between the respective inlets and the outlet. However, in other embodiments, the diameter of each passage 102 may vary between the inlet and the outlet. For example, in one non-limiting example, the passage may have a larger diameter inlet than the outlet, such that the passage is generally conically shaped (or includes one or more conical portions. In such embodiments, the passage may act as a nozzle that accelerates the flow of compressed air therethrough, which may be advantageous.

In exemplary embodiments, each of the passages 102 may be angled with respect to the axial centerline 52 of the combustor 17. For example, each of the passages 102 may define an angle 114 between an interior surface of the passage 102 and the axial centerline 52 of the combustor 17.

Additionally or alternatively, the angle 114 may be defined between an axial centerline of the passage 102 and the axial centerline 52 of the combustor 17. In many embodiments, the angle 114 may be between about 0° and about 90°, such as about 10° and about 80°, such as about 20° and about 70°, or such as about 30° and about 60°. In this way, each of the passages 102 may be advantageously slanted or sloped with respect to the both the radial direction R and the axial direction A of the combustor 17, which favorably allows the passages 102 to inject a flow of compressed air 15 into the annulus at an angle in order to diffuse flow wakes created by the airflow blockage 66.

In many embodiments, the at least one the passage 102 may extend between an inlet 116 and an outlet 118. In embodiments having multiple passages 102 defined within a wake energizer 100, such as the embodiment shown in FIG. 6, each of the passages 102 may extend between a respective inlet 116 and a respective outlet 118. In this way, each passage 102 may provides a separate stream of air into the annulus 60. In various embodiments, each of the passages 102 may be generally cylindrically shaped and may extend between a respective inlet 116 and a respective outlet 118. Each outlet 118 may align with a respective aperture 74 defined within the flow sleeve 62, in order to fluidly couple the passage 102 to the annulus 60.

As shown in FIG. 6, the inlet 116 of each passage 102 may be defined on one of the aft surface 110 or the radially outer surface 104. The outlet 118 of each passage 102 may be defined on the radially inner surface 106 and aligned with a respective aperture 74. In many embodiments, the wake energizer 100 may include a first group 120 of passages 102 extending between an inlet 116 defined on the aft surface 110 and an outlet 118 defined on the radially inner surface 106. Additionally, the wake energizer 100 may include a second group 122 of passages 102 extending between an inlet 116 defined on the radially outer surface 104 and an outlet 118 defined on the radially inner surface 106. For example, in such embodiments, each passage 102 in the first group 120 of passages 102 may extend from a respective inlet 116 defined on the aft surface 110 to an outlet to find in the radially inner surface. Likewise, each passage 102 in the second group 122 of passages 102 may extend from an inlet 116 defined on the radially outer surface 104 to an outlet defined on the radially inner surface. The inlet 116 of each passage 102 in the second group 122 of passages 102 may be disposed closer to the aft surface 110 of the wake energizer 100 than the forward surface 108.

Referring back to FIG. 3, the passages 102 of the wake energizer may be in a staggered arrangement. For example, each passage 102 in the second group 122 of passages 102 may be disposed circumferentially between two passages 102 in the first group 120 of passages 102. This arrangement may advantageously provide for a more uniform injection of air into the annulus 60.

In operation, a wake energizer 100 may be disposed in fluid communication with the annulus 60 directly axially forward of any airflow blockages 66 extending at least partially through the annulus 60. Compressed air flowing past the airflow blockages 66 may create wakes or undesired flow separation, which could decrease the uniformity of the air prior to use within the fuel nozzles. The wake energizer 100 advantageously injects a flow of compressed air at an angle immediately forward of the airflow blockage that diffuses any airflow wakes within the annulus 60. This provides for uniform flow within the annulus 60 in the entire circumferential direction C, which provides for better air to fuel mixing within the fuel nozzles and increases the efficiency of the combustor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor defining an axial centerline, the combustor comprising an end cover; an aft frame; a combustion liner extending between the end cover and the aft frame and defining a combustion chamber; at least one fuel nozzle extending from the end cover and in fluid communication with the combustion chamber; an outer sleeve spaced apart from and surrounding the combustion liner such that an annulus is defined therebetween, and wherein the outer sleeve defines at least one aperture; and a wake energizer mounted on the outer sleeve and extending radially outward from the outer sleeve, the wake energizer defining at least one passage that is angled with respect to the axial centerline of the combustor, the at least one passage aligning and in fluid communication with the at least one aperture of the outer sleeve.

The combustor of one or more of these clauses, further comprising an airflow blockage extending at least partially through the annulus, wherein the wake energizer is disposed forward of the airflow blockage.

The combustor of one or more of these clauses, wherein the airflow blockage is one of a crossfire tube, a flame detector, an igniter, a pressure sensor, a temperature sensor, or an axial fuel staging injector.

The combustor of one or more of these clauses, wherein the airflow blockage creates a flow wake within the annulus, and wherein the at least one passage of the wake energizer is configured to inject a stream of air forward of the airflow blockage to diffuse the flow wake within the annulus.

The combustor of one or more of these clauses, wherein the wake energizer defines a radially outer surface, a radially inner surface, a forward surface, an aft surface, and side surfaces.

The combustor of one or more of these clauses, wherein the radially inner surface is contoured to correspond with the outer sleeve.

The combustor of one or more of these clauses, wherein the at least one passage extends between an inlet and an outlet, the outlet disposed on the radially inner surface and aligned with the at least one aperture of the outer sleeve.

The combustor of one or more of these clauses, wherein the inlet is disposed on at least one of the aft surface and the radially outer surface.

The combustor of one or more of these clauses, wherein the outer sleeve comprises a flow sleeve and an impingement sleeve coupled to one another, wherein the flow sleeve extends between the end cover and the impingement sleeve, and wherein the impingement sleeve extends between the flow sleeve and the aft frame of the combustor.

The combustor of one or more of these clauses, wherein both the wake energizer and the airflow blockage are mounted to the flow sleeve.

A turbomachine comprising a compressor section; a turbine section; and a combustor disposed downstream from the compressor section and upstream from the turbine section, the combustor defining an axial centerline, the combustor comprising an end cover an aft frame; a combustion liner extending between the end cover and the aft frame and defining a combustion chamber; at least one fuel nozzle extending from the end cover and in fluid communication with the combustion chamber; an outer sleeve spaced apart from and surrounding the combustion liner such that an annulus is defined therebetween, and wherein the outer sleeve defines at least one aperture; and a wake energizer mounted on the outer sleeve and extending radially outward from the outer sleeve, the wake energizer defining at least one passage that is angled with respect to the axial centerline of the combustor, the at least one passage aligning and in fluid communication with the at least one aperture of the outer sleeve.

The turbomachine of one or more of these clauses, further comprising an airflow blockage extending at least partially through the annulus, wherein the wake energizer is disposed forward of the airflow blockage.

The turbomachine of one or more of these clauses, wherein the airflow blockage is one of a crossfire tube, a flame detector, an igniter, a pressure sensor, a temperature sensor, or an axial fuel staging injector.

The turbomachine of one or more of these clauses, wherein the airflow blockage creates flow wake within the annulus, and wherein the at least one passage of the wake energizer is configured to inject a stream of air forward of the airflow blockage to diffuse the flow wake within the annulus.

The turbomachine of one or more of these clauses, wherein the wake energizer defines a radially outer surface, a radially inner surface, a forward surface, an aft surface, and side surfaces.

The turbomachine of one or more of these clauses, wherein the radially inner surface is contoured to correspond with the outer sleeve.

The turbomachine of one or more of these clauses, wherein the at least one passage extends between an inlet and an outlet, the outlet disposed on the radially inner surface and aligned with the at least one aperture of the outer sleeve.

The turbomachine of one or more of these clauses, wherein the inlet is disposed on at least one of the aft surface and the radially outer surface.

The turbomachine of one or more of these clauses, wherein the outer sleeve comprises a flow sleeve and an impingement sleeve coupled to one another, wherein the flow sleeve extends between the end cover and the impingement sleeve, and wherein the impingement sleeve extends between the flow sleeve and the aft frame of the combustor.

The turbomachine of one or more of these clauses, wherein both the wake energizer and the airflow blockage are mounted to the flow sleeve.

What is claimed is:

1. A combustor defining an axial direction, a radial direction perpendicular to the axial direction, and a circumferential direction extending around the axial direction, the combustor comprising:
   an end cover;
   an aft frame;
   a combustion liner extending between the end cover and the aft frame and defining a combustion chamber;
   at least one fuel nozzle extending from the end cover and in fluid communication with the combustion chamber;
   an outer sleeve spaced apart from and surrounding the combustion liner such that an annulus is defined therebetween, and wherein the outer sleeve defines a plurality of apertures; and
   a wake energizer mounted on the outer sleeve and extending radially outward from the outer sleeve, the wake energizer defining a radially outer surface, a radially inner surface, a forward surface facing the end cover, an aft surface facing the aft frame, and side surfaces connecting the forward surface and the aft surface, the wake energizer defining a plurality of passages that are each angled with respect to the axial direction and the radial direction of the combustor, the plurality of passages each extending between a respective inlet and a respective outlet, wherein a first inlet of a first passage of the plurality of passages is disposed on the radially outer surface, wherein a second inlet of a second passage of the plurality of passages is disposed on the aft surface, the outlet of each passage of the plurality of passages aligning and in fluid communication with a respective aperture of the plurality of apertures of the outer sleeve.

2. The combustor of claim 1, further comprising an airflow blockage extending at least partially through the annulus, wherein the wake energizer is disposed forward of the airflow blockage with respect to a flow of combustion gases through the combustor.

3. The combustor of claim 2, wherein the airflow blockage is one of a crossfire tube, a flame detector, an igniter, a pressure sensor, a temperature sensor, or an axial fuel staging inj ector.

4. The combustor of claim 2, wherein the airflow blockage creates a flow wake within the annulus, and wherein the plurality of passages of the wake energizer is configured to inject a stream of air forward of the airflow blockage to diffuse the flow wake within the annulus.

5. The combustor of claim 2, wherein the outer sleeve comprises a flow sleeve and an impingement sleeve coupled to one another, wherein the flow sleeve extends between the end cover and the impingement sleeve, and wherein the impingement sleeve extends between the flow sleeve and the aft frame of the combustor.

6. The combustor of claim 5, wherein both the wake energizer and the airflow blockage are mounted to the flow sleeve.

7. The combustor of claim 1, wherein the radially inner surface is contoured to correspond with the outer sleeve.

8. The combustor of claim 1, wherein each outlet of the plurality of passages is disposed on the radially inner surface and aligned with a respective the at least one aperture of the plurality of apertures of the outer sleeve.

9. The combustor of claim 1, wherein the plurality of passages are arranged in a first group having inlets disposed on the aft surface and a second group having inlets disposed on the radially outer surface.

10. the combustor of claim 9, wherein the first group of passages and the second group of passages are in a staggered arrangement such that each passage in the second group of passages is disposed circumferentially between two passages in the first group of passages.

11. A turbomachine comprising:
    a compressor section;
    a turbine section; and a combustor disposed downstream from the compressor section and upstream from the turbine section, the combustor defining an axial direction, a radial direction perpendicular to the axial direction, and a circumferential direction extending around the axial direction, the combustor comprising:
an end cover;
an aft frame;
a combustion liner extending between the end cover and the aft frame and defining a combustion chamber;
at least one fuel nozzle extending from the end cover and in fluid communication with the combustion chamber;
an outer sleeve spaced apart from and surrounding the combustion liner such that an annulus is defined therebetween, and wherein the outer sleeve defines a plurality of apertures; and
  a wake energizer mounted on the outer sleeve and extending radially outward from the outer sleeve, the wake energizer defining a radially outer surface, a radially inner surface, a forward surface facing the end cover, an aft surface facing the aft frame, and side surfaces connecting the forward surface and the aft surface, the wake energizer defining a plurality of passages that are each angled with respect to the axial direction and the radial direction of the combustor, the plurality of passages each extending between a respective inlet and a respective outlet, wherein a first inlet of a first passage of the plurality of passages is disposed on the radially outer surface, wherein a second inlet of a second passage of the plurality of passages is disposed on the aft surface, the outlet of each passage of the plurality of passages aligning and in fluid communication with a respective aperture of the plurality of apertures of the outer sleeve.

12. The turbomachine of claim 11, further comprising an airflow blockage extending at least partially through the annulus, wherein the wake energizer is disposed forward of the airflow blockage with respect to a flow of combustion gases through the combustor.

13. The turbomachine of claim 12, wherein the airflow blockage is one of a crossfire tube, a flame detector, an igniter, a pressure sensor, a temperature sensor, or an axial fuel staging injector.

14. The turbomachine of claim 12, wherein the airflow blockage creates a flow wake within the annulus, and wherein the plurality of passages of the wake energizer is configured to inject a stream of air forward of the airflow blockage to diffuse the flow wake within the annulus.

15. The turbomachine of claim 12, wherein the outer sleeve comprises a flow sleeve and an impingement sleeve coupled to one another, wherein the flow sleeve extends between the end cover and the impingement sleeve, and wherein the impingement sleeve extends between the flow sleeve and the aft frame of the combustor.

16. The turbomachine of claim 15, wherein both the wake energizer and the airflow blockage are mounted to the flow sleeve.

17. The turbomachine of claim 11, wherein the radially inner surface is contoured to correspond with the outer sleeve.

* * * * *